US 9,556,868 B2

(12) United States Patent
Nam et al.

(10) Patent No.: US 9,556,868 B2
(45) Date of Patent: Jan. 31, 2017

(54) COMPRESSOR AND AIR CONDITIONER INCLUDING THE SAME

(71) Applicant: SAMSUNG ELECTRONICS CO., LTD., Suwon-si, Gyeonggi-do (KR)

(72) Inventors: Ki Hoon Nam, Goyang-si (KR); Soo Dol Park, Suwon-si (KR); Jeong Bae Lee, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 295 days.

(21) Appl. No.: 14/302,600

(22) Filed: Jun. 12, 2014

(65) Prior Publication Data

US 2015/0040608 A1 Feb. 12, 2015

(30) Foreign Application Priority Data

Aug. 9, 2013 (KR) ........................ 10-2013-0094828

(51) Int. Cl.
| | |
|---|---|
| *F25D 17/00* | (2006.01) |
| *F04C 2/356* | (2006.01) |
| *F04C 15/06* | (2006.01) |
| *F01C 21/10* | (2006.01) |
| *F04C 29/04* | (2006.01) |

(Continued)

(52) U.S. Cl.
CPC ........... *F04C 2/3564* (2013.01); *F01C 21/104* (2013.01); *F04C 15/06* (2013.01); *F04C 18/356* (2013.01); *F04C 29/042* (2013.01); *F25B 31/006* (2013.01); *F25B 49/02* (2013.01); *F04C 23/008* (2013.01); *F25B 1/04* (2013.01); *F25B 13/00* (2013.01); *F25B 2600/0253* (2013.01);

(Continued)

(58) Field of Classification Search
CPC ............. F25C 1/06; F25C 1/147; F25B 39/04; F25B 40/02; F25D 17/065; F25D 2400/04
USPC ........... 62/498, 89, 115, 118, 189, 193, 508; 418/63

See application file for complete search history.

(56) References Cited

U.S. PATENT DOCUMENTS

| | | | |
|---|---|---|---|
| 2,904,973 A | | 9/1959 | Kosfeld |
| 3,105,633 A | * | 10/1963 | Dellario ................ F25B 31/008 |
| | | | 418/180 |

(Continued)

FOREIGN PATENT DOCUMENTS

JP 63-117192 5/1988

OTHER PUBLICATIONS

European Search Report issued Dec. 17, 2014 in corresponding European Patent Application No. 14172192.8.

*Primary Examiner* — Melvin Jones
(74) *Attorney, Agent, or Firm* — Staas & Halsey LLP

(57) ABSTRACT

A compressor and an air conditioner including the same having an improved structure capable of decreasing a discharge temperature of the compressor. The compressor which compresses and discharges refrigerant includes a casing defining an external appearance thereof, at least one cylinder including an inner space, a rolling piston which eccentrically turns in the inner space, a vane which radially abuts the rolling piston and divides the inner space into a suction chamber and a compression chamber, and a vane chamber recessed outward of the inner space such that the vane advances and retreats, a plurality of plates disposed above and below the at least one cylinder so as to define the inner space, an injection line provided in one of the at least one cylinder and the plural plates, and a check valve installed on the injection line.

21 Claims, 13 Drawing Sheets

(51) Int. Cl.
    *F04C 18/356*    (2006.01)
    *F25B 49/02*     (2006.01)
    *F25B 31/00*     (2006.01)
    *F25B 1/04*      (2006.01)
    *F04C 23/00*     (2006.01)
    *F25B 13/00*     (2006.01)

(52) U.S. Cl.
    CPC ............... *F25B 2600/2509* (2013.01); *F25B 2700/21152* (2013.01); *Y02B 30/741* (2013.01)

(56) References Cited

U.S. PATENT DOCUMENTS

| | | | | |
|---|---|---|---|---|
| 3,109,297 A | * | 11/1963 | Rinehart | ............... F25B 31/008 |
| | | | | 417/438 |
| 3,191,403 A | | 6/1965 | Ladusaw | |
| 3,423,013 A | | 1/1969 | Rinehart | |
| 4,045,974 A | | 9/1977 | McCarty | |

* cited by examiner

COMPRESSOR AND AIR CONDITIONER INCLUDING THE SAME

CROSS-REFERENCE TO RELATED APPLICATIONS

This application claims the benefit of Korean Patent Application No. 10-2013-0094828, filed on Aug. 9, 2013 in the Korean Intellectual Property Office, the disclosure of which is incorporated herein by reference.

BACKGROUND

1. Field

Embodiments of the present disclosure relate to a compressor and an air conditioner including the same having an improved structure capable of decreasing a discharge temperature of the compressor.

2. Description of the Related Art

In general, an air conditioner includes an outdoor unit and an indoor unit. The outdoor unit is provided with a compressor, an outdoor side heat exchanger, and an expansion valve, and the indoor unit is provided with an indoor side heat exchanger.

The compressor, the outdoor side heat exchanger, the expansion valve, and the indoor side heat exchanger are connected by a refrigerant pipe so as to form a cooling and heating cycle.

In the typical air conditioner, a discharge temperature of the compressor when R32 refrigerant is used further increases to a level of 10 to 20° C., compared with when R22 refrigerant is used. Since a temperature in the compressor increases as the discharge temperature increases, reliability of the air conditioner may be deteriorated due to exceeding the heatproof temperature of an insulator in a drive element.

In addition, a hermetic compressor in which lubricant oil is accommodated in a hermetic container is used as the compressor of the air conditioner. The hermetic compressor prevents wear by supplying lubricant oil to an operation part of a compression device. However, since an overall inner temperature in the compressor increases as the discharge temperature of the compressor increases, the temperature of the lubricant oil also increases. As a result, viscosity of the lubricant oil decreases and thus wear of the compression device is generated.

SUMMARY

Therefore, it is an aspect of the present disclosure to provide a compressor and an air conditioner including the same having an improved structure capable of decreasing a discharge temperature of the compressor.

It is another aspect of the present disclosure to provide a compressor and an air conditioner including the same having an improved structure such that heating performance is improved by an increase in refrigerant flow.

Additional aspects of the disclosure will be set forth in part in the description which follows and, in part, will be apparent from the description, or may be learned by practice of the disclosure.

In accordance with one aspect of the present disclosure, a compressor which compresses and discharges refrigerant includes a casing defining an external appearance thereof, at least one cylinder including an inner space, a rolling piston which eccentrically turns in the inner space, a vane which radially abuts the rolling piston and divides the inner space into a suction chamber and a compression chamber, and a vane chamber recessed outward of the inner space such that the vane advances and retreats, the cylinder being provided within the casing, a plurality of plates disposed above and below the at least one cylinder so as to define the inner space, an injection line provided in an area, within an angle of 220 to 340 degrees from a position of the vane of the at least one cylinder in a direction of rotation of the rolling piston, in one of the at least one cylinder and the plural plates, intermediate pressure refrigerant being supplied to the inner space of the at least one cylinder through the injection line, and a check valve installed on the injection line.

The refrigerant may be a mixture of R32 refrigerant and at least one refrigerant of R1234yf, R1234ze, and R152A.

The check valve may be installed by passing through one of the at least one cylinder and the plural plates.

The at least one cylinder may include a first cylinder including a first supply tube through which refrigerant is supplied to the inner space and a first discharge tube through which compressed refrigerant is discharged into an inner space of the casing, and a second cylinder located between the first cylinder and a bottom of the casing, and including a second supply tube diverging from the first supply tube and a second discharge tube through which compressed refrigerant is discharged into the inner space of the casing, and the plural plates may include a first plate located at an upper side of the first cylinder, a second plate located between the first and second cylinders, and a third plate located between the second cylinder and the bottom of the casing.

The check valve may pass through the first cylinder and be installed in the area within the angle of 220 to 340 degrees from the position of the vane of the first cylinder in the direction of rotation of the rolling piston, and the intermediate pressure refrigerant supplied from the check valve to the inner space of the first cylinder may be compressed by the rolling piston and be discharged into the inner space of the casing through the first discharge tube passing through the first plate.

The check valve may pass through the second cylinder and be installed in the area within the angle of 220 to 340 degrees from the position of the vane of the second cylinder in the direction of rotation of the rolling piston, and the intermediate pressure refrigerant supplied from the check valve to the inner space of the second cylinder may be compressed by the rolling piston and be discharged into the inner space of the casing through the second discharge tube passing through the third plate.

The check valve may be installed at a position corresponding to the area within the angle of 220 to 340 degrees from the position of the vane of the first cylinder in the direction of rotation of the rolling piston by passing through the first plate, and the intermediate pressure refrigerant supplied from the check valve to the inner space of the first cylinder may be compressed by the rolling piston and be discharged into the inner space of the casing through the first discharge tube passing through the first plate.

The check valve may be installed at a position corresponding to the area within the angle of 220 to 340 degrees from the position of the vane of the first or second cylinder in the direction of rotation of the rolling piston by passing through the second plate, and the intermediate pressure refrigerant supplied from the check valve to the inner space of the first or second cylinder may be compressed by the rolling piston and be discharged into the inner space of the casing through the first discharge tube passing through the first plate or the second discharge tube passing through the third plate.

The check valve may be installed at a position corresponding to the area within the angle of 220 to 340 degrees from the position of the vane of the second cylinder in the direction of rotation of the rolling piston by passing through the third plate, and the intermediate pressure refrigerant supplied from the check valve to the inner space of the second cylinder may be compressed by the rolling piston and be discharged into the inner space of the casing through the second discharge tube passing through the third plate.

The check valve installed to the first plate may have a shape bent toward the inner space of the first cylinder, the check valve installed to the second plate may have a shape bent toward the first or second cylinder, and the check valve installed to the third plate may have a shape bent toward the second cylinder.

The intermediate pressure refrigerant may be a mixture of R32 refrigerant and at least one refrigerant of R1234yf, R1234ze, and R152A.

In accordance with another aspect of the present disclosure, an air conditioner includes a compressor, a condenser which condenses high temperature and high pressure refrigerant obtained by the compressor, an expansion valve which converts the refrigerant discharged from the condenser into low pressure refrigerant, and an evaporator by which the refrigerant discharged from the expansion valve is evaporated and converted into low temperature and low pressure refrigerant, wherein the compressor includes a casing defining an external appearance thereof, at least one cylinder including an inner space, a rolling piston which eccentrically turns in the inner space, a vane which radially abuts the rolling piston and divides the inner space into a suction chamber and a compression chamber, and a vane chamber recessed outward of the inner space such that the vane advances and retreats, the cylinder being provided within the casing, a plurality of plates disposed above and below the at least one cylinder so as to define the inner space, and a check valve provided in one of the at least one cylinder and the plural plates, intermediate pressure refrigerant being supplied to the inner space of the at least one cylinder through the check valve.

The check valve may be provided in a first area within an angle of 220 to 340 degrees from a position of the vane of the at least one cylinder in a direction of rotation of the rolling piston or in a second area of at least one of the plural plates corresponding to the first area.

The air conditioner may further include an injection line connecting the condenser and the compressor.

The check valve may be provided on the injection line.

The refrigerant may be a mixture of R32 refrigerant and at least one refrigerant of R1234yf, R1234ze, and R152A.

The check valve may supply liquid-phase or gas-phase refrigerant having intermediate pressure to the inner space of the at least one cylinder, depending upon a phase of the refrigerant introduced through the injection line from the condenser.

In accordance with a further aspect of the present disclosure, a compressor includes a casing defining an external appearance thereof, at least one cylinder including an inner space, a rolling piston which eccentrically turns in the inner space, a vane which radially abuts the rolling piston and divides the inner space into a suction chamber and a compression chamber, and a vane chamber recessed outward of the inner space such that the vane advances and retreats, the cylinder being provided within the casing, a plurality of plates disposed above and below the at least one cylinder so as to define the inner space, an injection line installed by passing through one of the at least one cylinder and the plural plates, intermediate pressure refrigerant being supplied to the inner space of the at least one cylinder through the injection line, a check valve installed on the injection line, and a drive element which has a rotary shaft passing through the at least one cylinder and the plural plates and provides driving force allowing the rolling piston to turn.

The drive element may include a Brushless Direct Current (BLDC) motor in which rotational speed of the rotary shaft is variable or a constant-speed motor in which rotational speed of the rotary shaft is constant.

The check valve may be provided in an area within an angle of 220 to 340 degrees from a position of the vane of the at least one cylinder in a direction of rotation of the rolling piston.

The check valve may be provided in at least one of the plural plates corresponding to an area within an angle of 220 to 340 degrees from a position of the vane of the at least one cylinder in a direction of rotation of the rolling piston.

The at least one cylinder may include a first cylinder including a first supply tube through which refrigerant is supplied to the inner space and a first discharge tube through which compressed refrigerant is discharged into an inner space of the casing, and a second cylinder located between the first cylinder and a bottom of the casing, and including a second supply tube installed separately from the first supply tube and a second discharge tube through which compressed refrigerant is discharged into the inner space of the casing, and the refrigerant supplied to the first or second supply tube may be a mixture of R32 refrigerant and at least one refrigerant of R1234yf, R1234ze, and R152A.

The injection line may be connected to a condenser which condenses high temperature and high pressure refrigerant discharged from a discharge pipe protruding from a surface of the casing.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
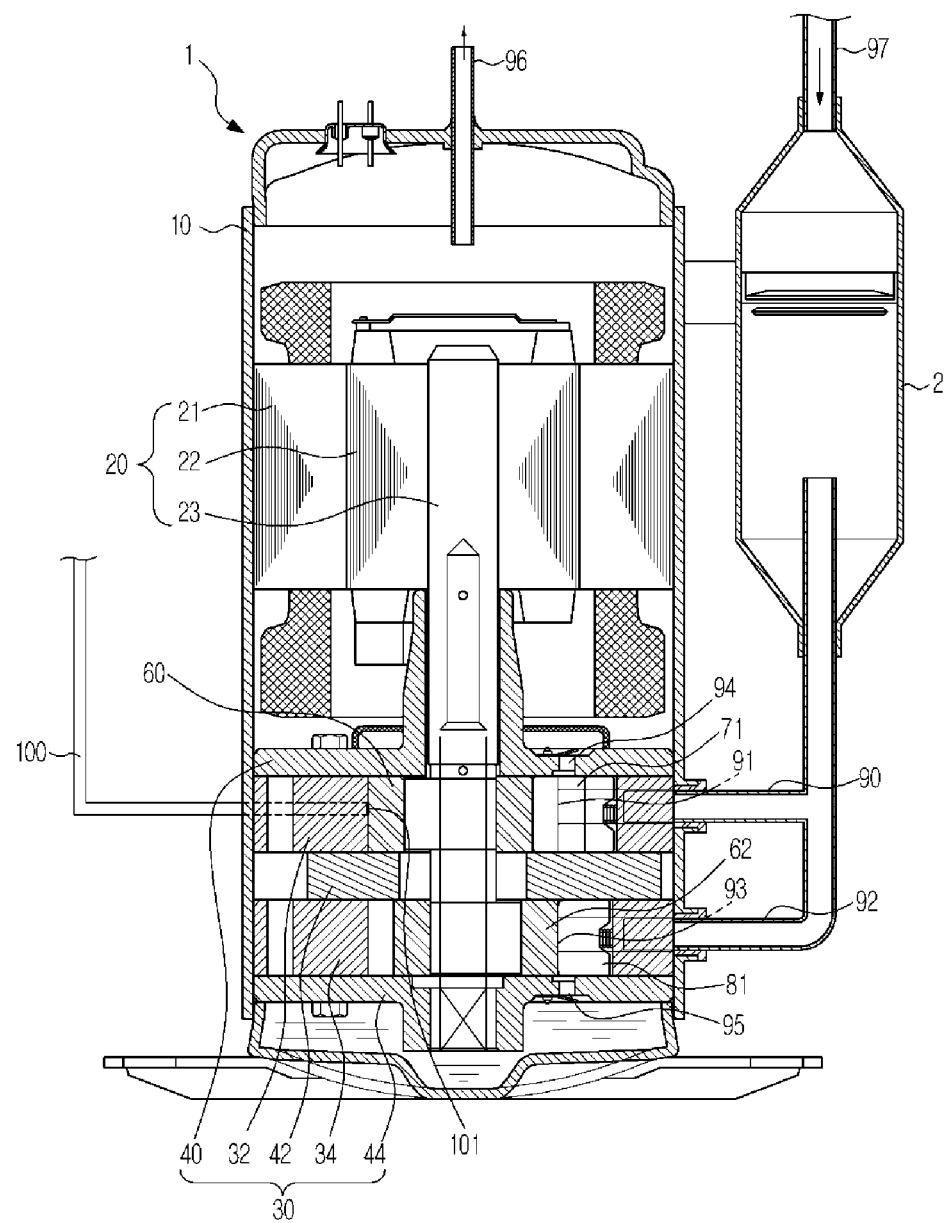
FIG. 1 is a cross-sectional view illustrating a configuration of a compressor according to an embodiment of the present disclosure.

Reference will now be made in detail to the embodiments of the present disclosure, examples of which are illustrated in the accompanying drawings, wherein like reference numerals refer to like elements throughout.

Figure 2:
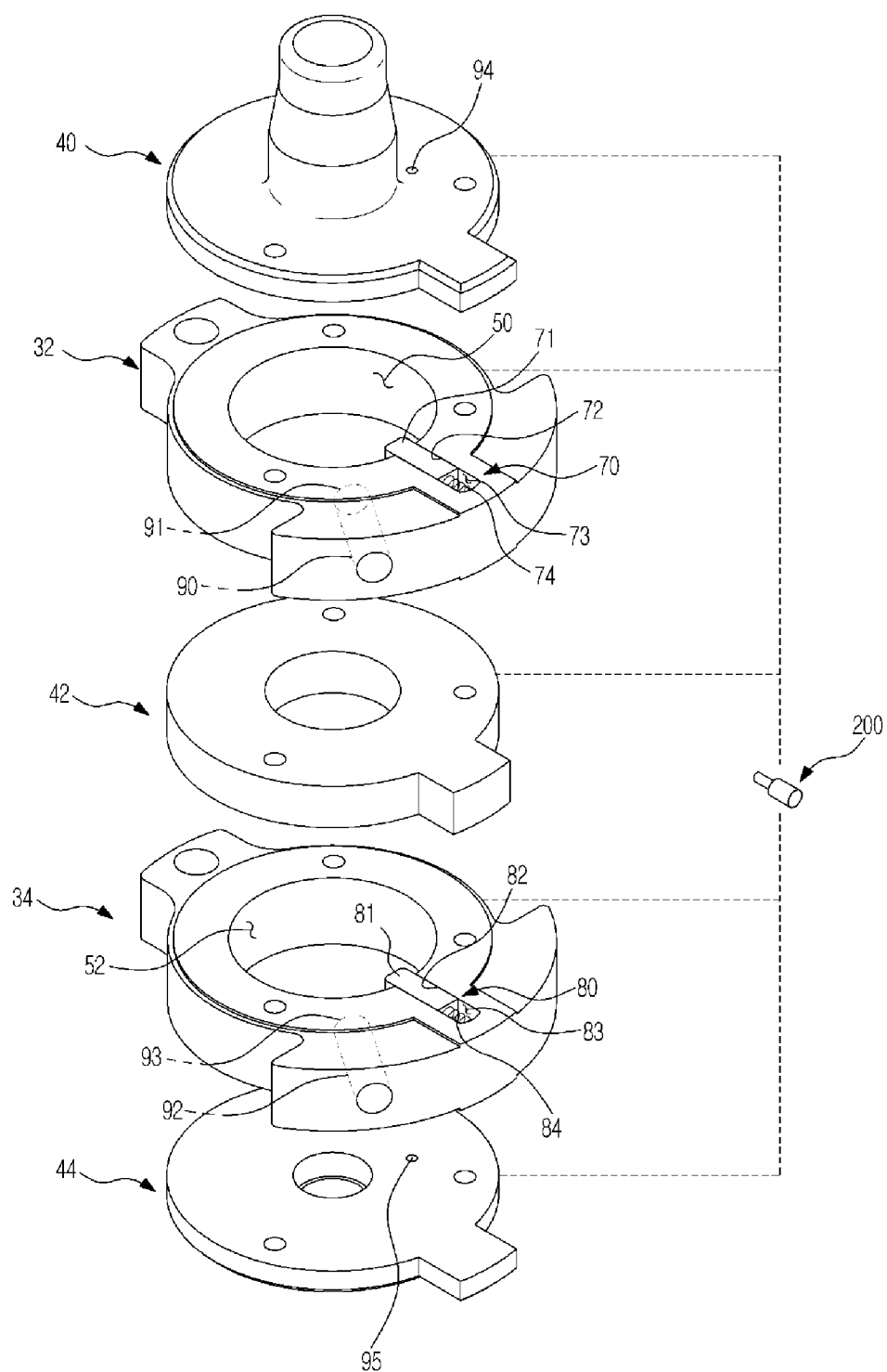
FIG. 2 is an exploded perspective view of some components provided in the compressor according to the embodiment of the present disclosure.
Figure 3:
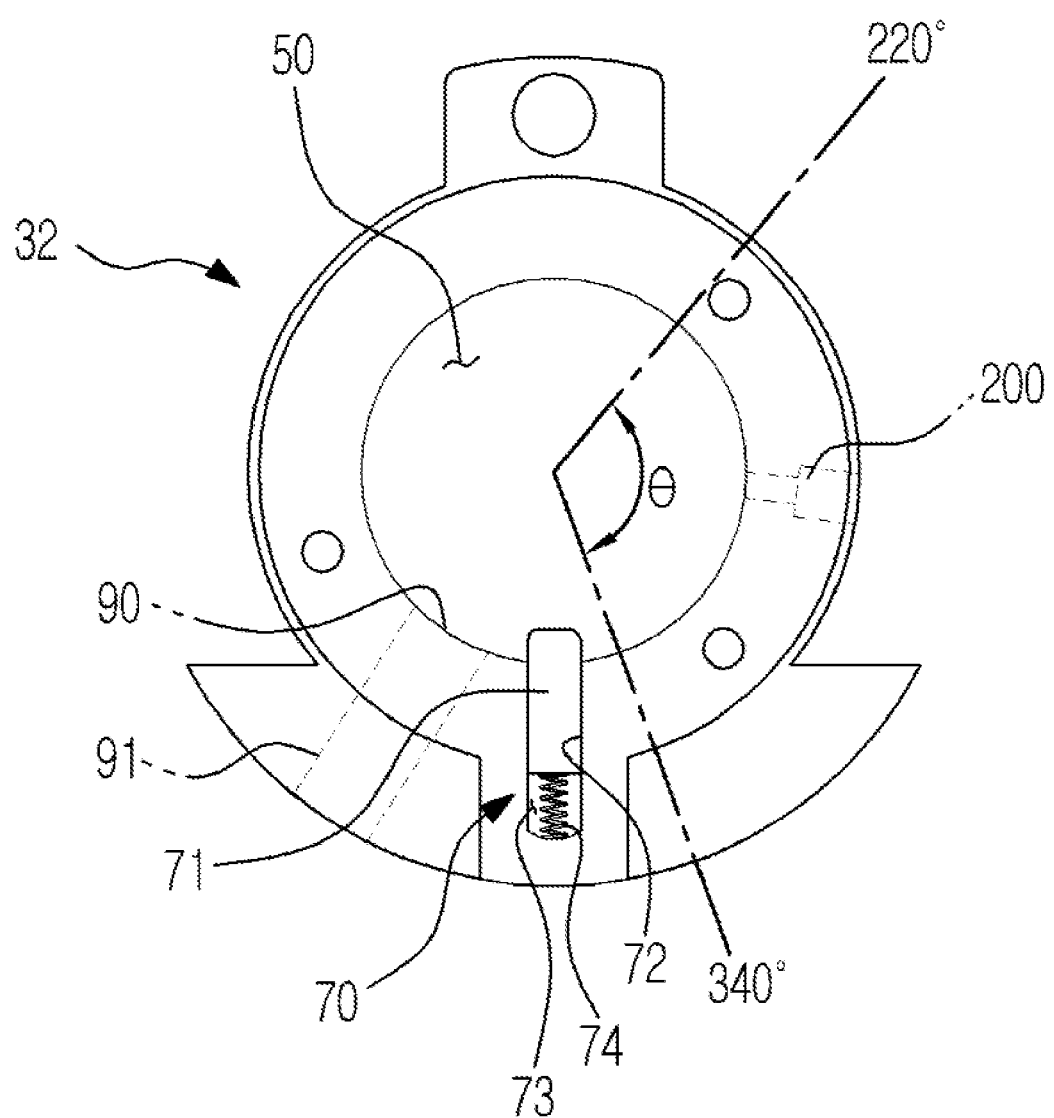
FIGS. 3 to 8 are views illustrating a structure in which a check valve is inserted into the components provided in the compressor according to the embodiment of the present disclosure.
Figure 4:
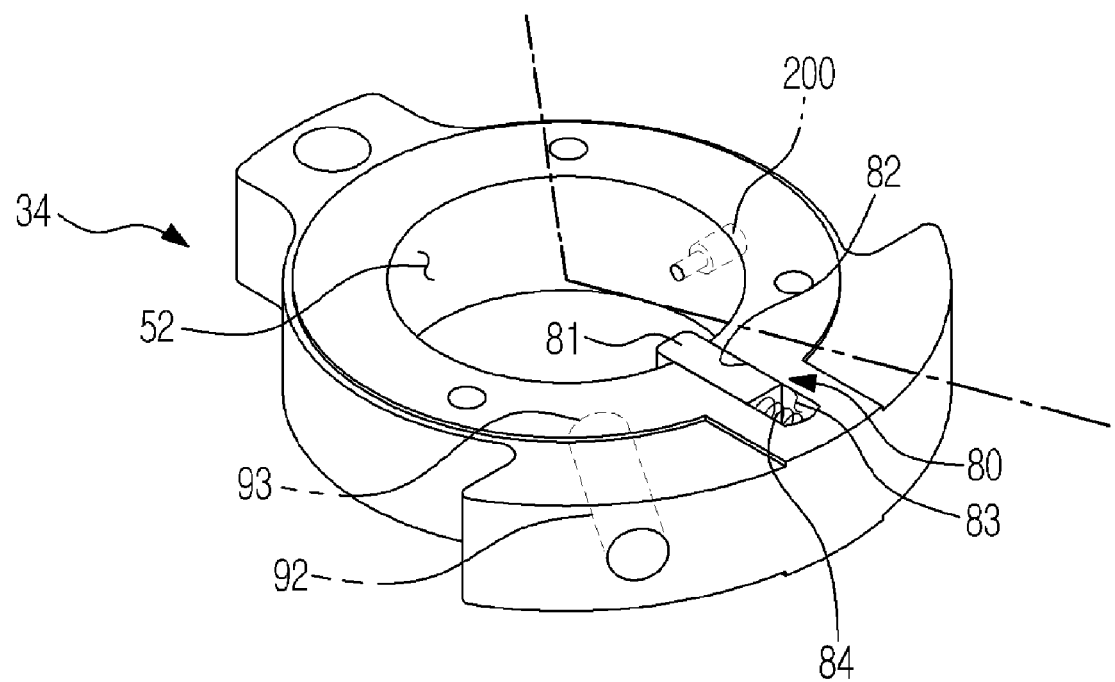

FIG. 1 is a cross-sectional view illustrating a configuration of a compressor according to an embodiment of the present disclosure. FIG. 2 is an exploded perspective view of some components provided in the compressor according to the embodiment of the present disclosure.

As shown in FIG. 1, the compressor 1 may include a casing 10 defining an external appearance thereof, a drive element 20 installed at an upper portion inside the casing 10, and a compression element 30 which is installed at a lower portion inside the casing 10 and is connected to the drive element 20 through a rotary shaft 23.

The drive element 20 includes a cylindrical stator 21 fixed to an inner surface of the casing 10, and a rotor 22 which is rotatably installed within the stator 21 and is coupled at a central portion thereof to the rotary shaft 23. The drive element 20 may drive the compression element 30 connected thereto through the rotary shaft 23 by rotation of the rotor 22 when power is supplied thereto.

The drive element 20 may include a BLDC motor in which rotational speed of the rotary shaft 23 is variable or a constant-speed motor in which rotational speed of the rotary shaft 23 is constant.

The stator 21 may be provided with an insulator (not shown) to absorb heat generated by the drive element 20.

At least one cylinder may be provided, but two cylinders are provided in the present embodiment for convenience of description.

The compression element 30 may include a plurality of cylinders 32 and 34 having respective inner spaces 50 and 52 divided from each other, a plurality of plates 40, 42, and 44 disposed above and below the plural cylinders 32 and 34 so as to define the inner spaces 50 and 52, and an injection line 100 through which intermediate pressure refrigerant is supplied to the inner spaces 50 and 52 of the plural cylinders 32 and 34.

The plural cylinders 32 and 34 respectively include the inner spaces 50 and 52, rolling pistons 60 and 62 which eccentrically turn in the inner spaces 50 and 52, vanes 71 and 81 which radially abut the rolling pistons 60 and 62 and divide the inner spaces 50 and 52 into a suction chamber (not shown) and a compression chamber (not shown), and vane chambers 70 and 80 recessed outward of the inner spaces 50 and 52 such that the vanes 71 and 81 advance and retreat. The plural cylinders 32 and 34 may be provided within the casing 10.

The cylinders may include a first cylinder 32 having a first inner space 50 and a second cylinder 34 which has a second inner space 52 and is disposed beneath the first cylinder 32.

The plates are respectively disposed above and below the plural cylinders 32 and 34 to define the inner spaces 50 and 52, and may include a first plate 40 located at the upper side of the first cylinder 32, a second plate 42 located between the first and second cylinders 32 and 34, and a third plate 44 located between the second cylinder 34 and the bottom of the casing 10.

The first and second cylinders 32 and 34 are respectively formed with supply ports 91 and 93 connected to supply tubes 90 and 92 such that refrigerant may be introduced into the first and second inner spaces 50 and 52, and discharge tubes 94 and 95 through which the refrigerant compressed in the compression chamber (not shown) is discharged into the casing 10. Accordingly, when the compressor 1 is operated, the casing 10 is maintained therein at high pressure by compressed gas discharged through the discharge tubes 94 and 95 and the compressed gas in the casing 10 is guided to the outside through a discharge pipe 96 formed at an upper surface of the casing 10.

Specifically, the first cylinder 32 may include a first supply tube 90 through which refrigerant is supplied to the first inner space 50 and a first discharge tube 94 through which the compressed refrigerant is discharged into an inner space of the casing.

In addition, the second cylinder 34 may include a second supply tube 92 diverging from the first supply tube 90 and a second discharge tube 95 through which the compressed refrigerant is discharged into the inner space of the casing.

An accumulator 2 is arranged to abut the compressor 1, thereby preventing refrigerant, which does not reach gas and is present as a liquid phase in low temperature and low pressure refrigerant discharged from an evaporator, from being introduced into the compressor 1. The low temperature and low pressure refrigerant discharged from the evaporator is introduced into the accumulator 2 through a suction pipe 97.

Refrigerant passes through the accumulator 2 and is then guided to each of the supply ports 91 and 93 of the inner spaces 50 and 52 through the supply tubes 90 and 92.

The rotary shaft 23 may pass through the centers of the first and second inner spaces 50 and 52 and be connected to a first rolling piston 60 and a second rolling piston 62 provided in the first and second inner spaces 50 and 52.

The first and second rolling pistons 60 and 62 are coupled to the rotary shaft 23, and specifically may be coupled in a state of being eccentric in different directions in relation to each other. Such a configuration allows the first and second rolling pistons 60 and 62 to eccentrically rotate in the inner spaces 50 and 52 and compress a medium to be compressed (refrigerant).

The vanes 71 and 81 may include a first vane 71 provided in the first cylinder 32 and a second vane 81 provided in the second cylinder 34. The vanes 71 and 81 may radially abut the rolling pistons 60 and 62 and divide the inner spaces 50 and 52 into the suction chamber (not shown) and the compression chamber (not shown).

The vane chambers 70 and 80 may include a first vane chamber 70 provided in the first cylinder 32 and a second vane chamber 80 provided in the second cylinder 34.

The vane chambers 70 and 80 are recessed outward of the inner spaces 50 and 52. The first vane chamber 70 may include a first vane guide portion 72 to guide the first vane 71 recessed outward of the first inner space 50 from an inner wall surface thereof, and a first vane spring accommodation portion 73 provided with a first vane spring 74 to press the first vane 71 toward the first rolling piston 60 such that the first vane 71 may divide the first inner space 50.

The second vane chamber 80 may include a second vane guide portion 82 to guide the second vane 81 recessed outward of the second inner space 52 from an inner wall surface thereof, and a second vane spring accommodation portion 83 provided with a second vane spring 84 to press the second vane 81 toward the second rolling piston 62 such that the second vane 81 may divide the second inner space 52.

The injection line 100 may be installed by passing through at least one of the plural cylinders 32 and 34 and the plural plates 40, 42, and 44.

Intermediate pressure refrigerant supplied to at least one of the inner spaces 50 and 52 of the plural cylinders 32 and 34 may pass through an injection supply port 101 formed on at least one inner wall surface of the plural cylinders 32 and 34.

The injection line 100 may be installed in a direction equal to or different from the first or second supply tube 90 or 92.

In addition, the second supply tube 92 may be separately installed without diverging from the first supply tube 90.

FIGS. 3 to 8 are views illustrating a structure in which a check valve is inserted into the components provided in the compressor according to the embodiment of the present disclosure.

The check valve 200 may be formed on the injection line 100.

The check valve 200 is a valve by which fluid flows in a certain direction. Particularly, when the inner pressure of the first or second cylinder 32 or 34 into which the injection line 100 is inserted is larger than that of the injection line 100, it may be possible to prevent refrigerant from flowing backward toward the injection line 100.

The check valve 200 may include a wafer type valve, split type valve, swing type valve, lift type valve, mushroom type valve, and disc type valve.

The check valve 200 provided at a distal end of the injection line 100 may be installed by passing through at least one of the plural cylinders 32 and 34 and the plural plates 40, 42, and 44.

The check valve 200 may be provided in an area (first area) within an angle of 220 to 340 degrees from at least one position of the vanes 71 and 81 of the plural cylinders 32 and 34 in a direction of rotation of the rolling pistons 60 and 62.

In addition, the check valve 200 may be provided in a second area of at least one of the plural plates 40, 42, and 44, corresponding to the first area.

Since the inner pressure of the cylinders 32 and 34 is larger than that of the injection line 100 in the area within the angle of 220 to 340 degrees from at least one position of the vanes 71 and 81 of the plural cylinders 32 and 34 in the direction of rotation of the rolling pistons 60 and 62, refrigerant may flow backward toward the injection line 100.

Accordingly, by installing the check valve 200 in the area (first area) within the angle of 220 to 340 degrees from at least one position of the vanes 71 and 81 of the plural cylinders 32 and 34 in the direction of rotation of the rolling pistons 60 and 62 or in the second area of at least one of the plural plates 40, 42, and 44, corresponding to the first area, it may be possible to prevent backflow of intermediate pressure refrigerant.

Specifically, the check valve 200 may pass through the first cylinder 32 and be installed in the area within the angle of 220 to 340 degrees from the position of the first vane 71 of the first cylinder 32 in the direction of rotation of the first rolling piston 60. The intermediate pressure refrigerant supplied from the check valve 200 to the inner space 50 of the first cylinder 32 may be compressed by the first rolling piston 60 and discharged into the inner space of the casing 10 through the first discharge tube 94 passing through the first plate 40.

In addition, the check valve 200 may pass through the second cylinder 34 and be installed in the area within the angle of 220 to 340 degrees from the position of the second vane 81 of the second cylinder 34 in the direction of rotation of the second rolling piston 62. The intermediate pressure refrigerant supplied from the check valve 200 to the inner space 52 of the second cylinder 34 may be compressed by the second rolling piston 62 and discharged into the inner space of the casing 10 through the second discharge tube 95 passing through the third plate 44.

In addition, the check valve 200 may be installed at a position corresponding to the area within the angle of 220 to 340 degrees from the position of the first vane 71 of the first cylinder 32 in the direction of rotation of the first rolling piston 60 by passing through the first plate 40. The intermediate pressure refrigerant supplied from the check valve 200 to the inner space 50 of the first cylinder 32 may be compressed by the first rolling piston 60 and discharged into the inner space of the casing 10 through the first discharge tube 94 passing through the first plate 40.

In addition, the check valve 200 may be installed at a position corresponding to the area within the angle of 220 to 340 degrees from the position of the vane 71 or 81 of the first or second cylinder 32 or 34 in the direction of rotation of the rolling piston 60 or 62 by passing through the second plate 42. The intermediate pressure refrigerant supplied from the check valve 200 to the inner space of the first or second cylinder 32 or 34 may be compressed by the rolling piston 60 or 62 and discharged into the inner space of the casing 10 through the first discharge tube 94 passing through the first plate 40 or the second discharge tube 95 passing through the third plate 44.

In addition, the check valve 200 may be installed at a position corresponding to the area within the angle of 220 to 340 degrees from the position of the second vane 81 of the second cylinder 34 in the direction of rotation of the second rolling piston 62 by passing through the third plate 44. The intermediate pressure refrigerant supplied from the check valve 200 to the inner space of the second cylinder 34 may be compressed by the second rolling piston 62 and discharged into the inner space of the casing 10 through the second discharge tube 95 passing through the third plate 44.

The check valve 200 may have a bent shape.

Figure 5:
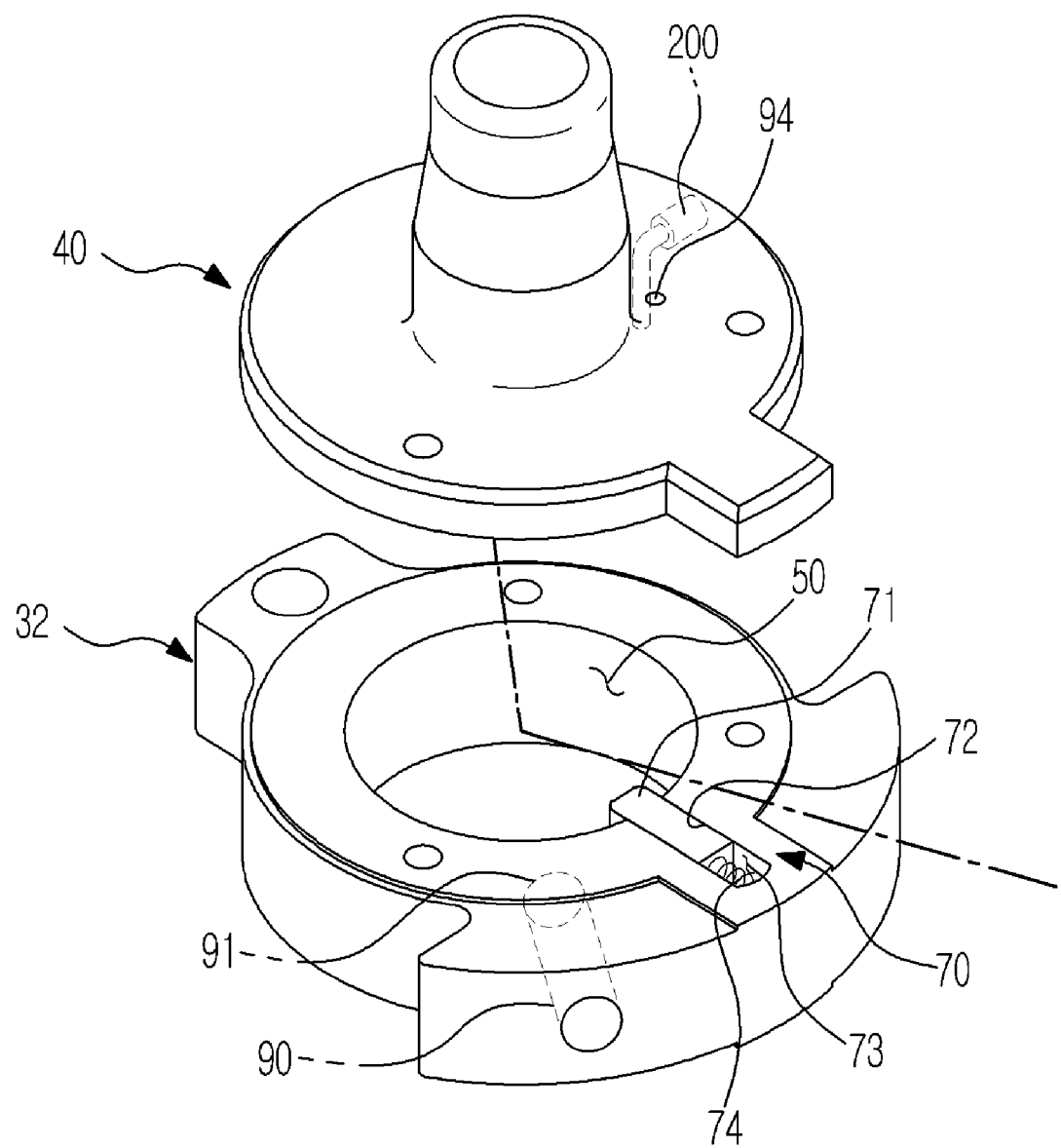

Specifically, as shown in FIG. 5, the check valve 200 installed to the first plate 40 may have a shape bent toward the inner space 50 of the first cylinder 32.

Figure 6:
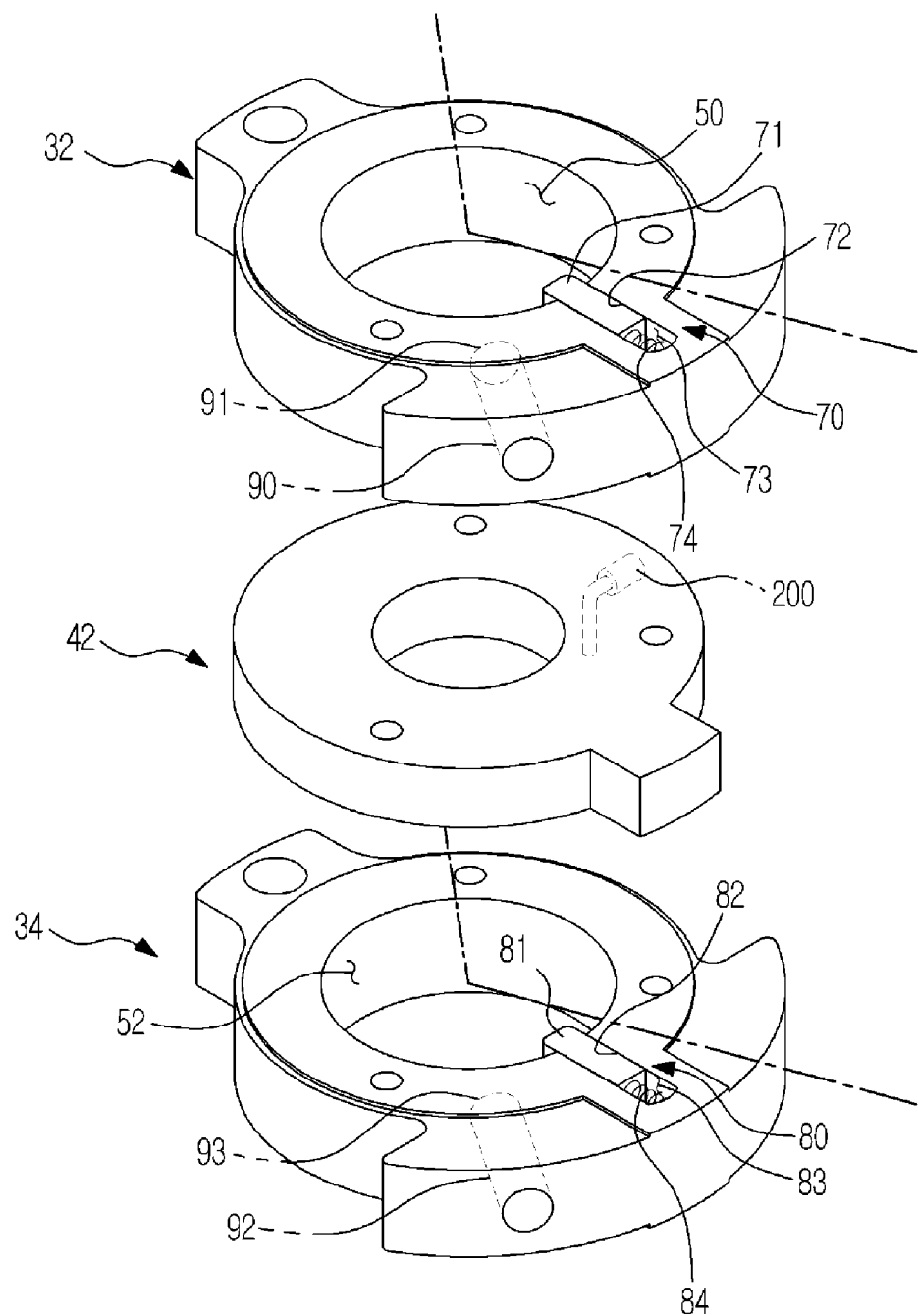
Figure 7:
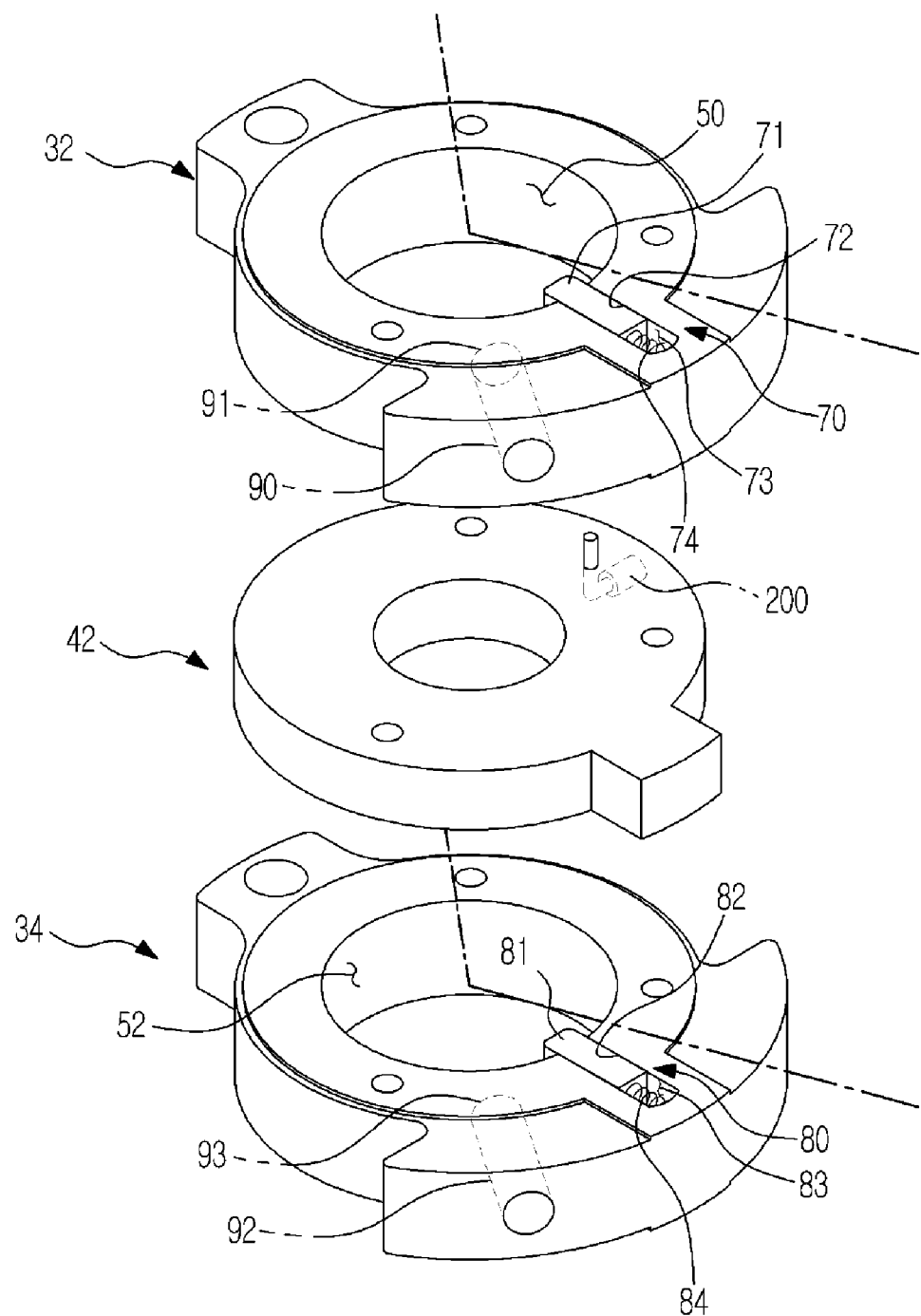

In addition, as shown in FIGS. 6 and 7, the check valve 200 installed to the second plate 42 may have a shape bent toward the first or second cylinder 32 or 34.

Figure 8:
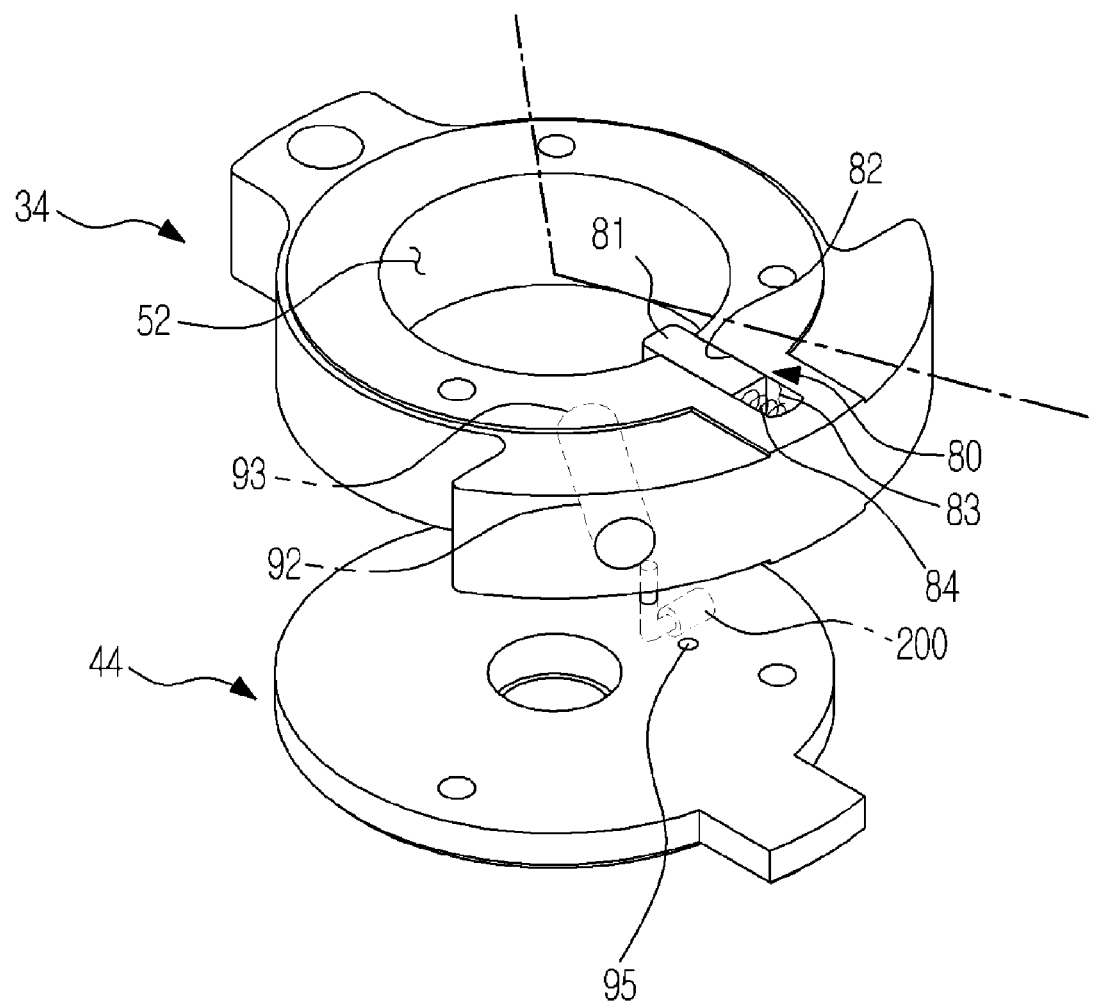

In addition, as shown in FIG. 8, the check valve 200 installed to the third plate 44 may have a shape bent toward the second cylinder 34.

The check valve 200 installed to the second plate 42 may have a "⊢" shape bent toward both of the first and second cylinders 32 and 34.

The check valve 200 installed to each of the plural plates 40, 42, and 44 may have various shapes so as to inject intermediate pressure refrigerant toward the inner space 50 of the first cylinder 32 of the inner space 52 of the second cylinder 34.

The refrigerant used for the compressor 1 or supplied from the injection line 100 to the compressor 1 may be a mixture of R32 refrigerant and at least one refrigerant of R1234yf, R1234ze, and R152A.

A mixture of R32 refrigerant of 40 to 90% and at least one refrigerant of 10 to 60% selected among R1234yf, R1234ze, and R152A may be used.

In addition, R32 refrigerant may be used alone.

Figure 9:
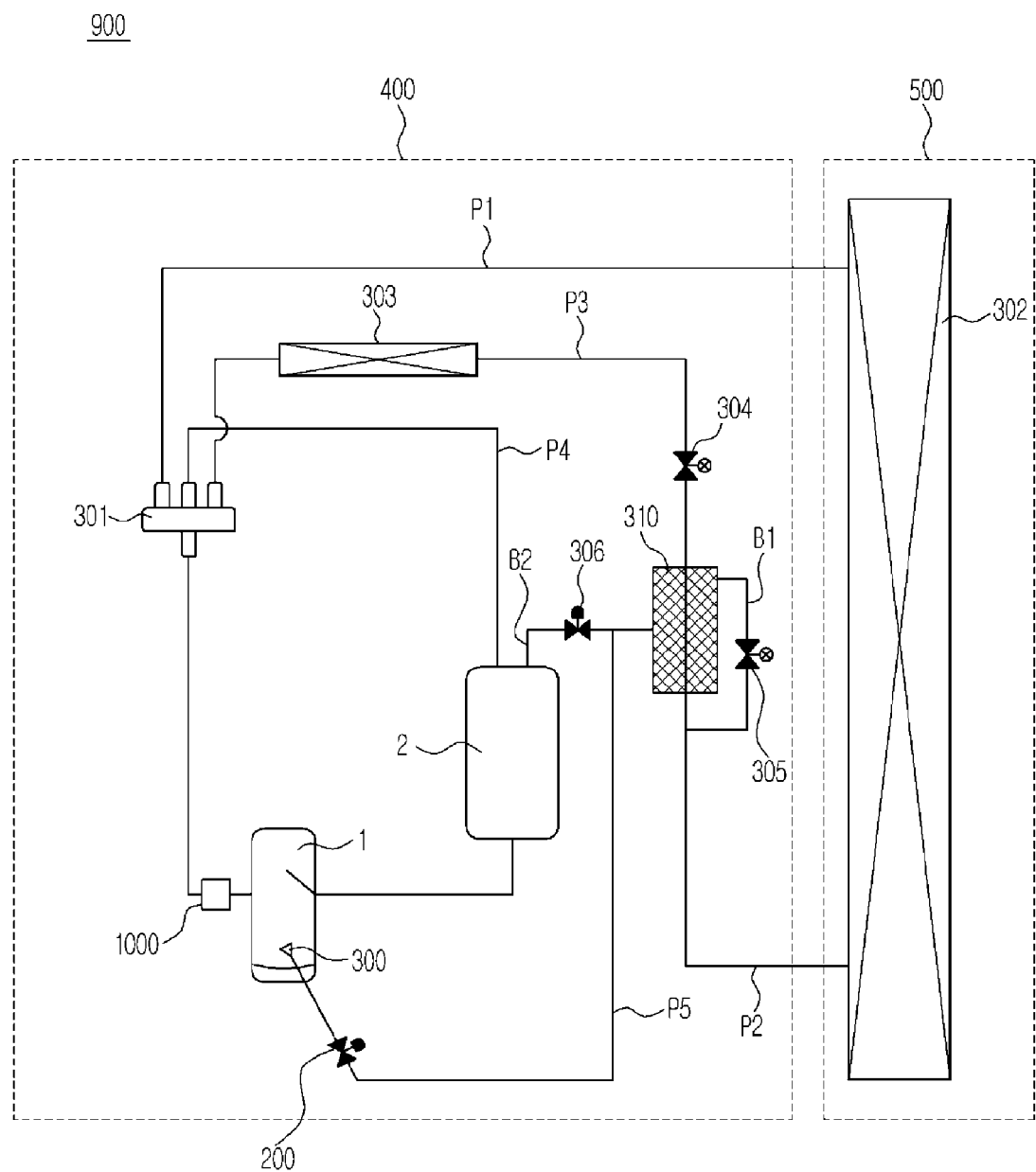
FIGS. 9 and 10 are diagrams illustrating a configuration of an air conditioner according to an embodiment of the present disclosure.
Figure 10:
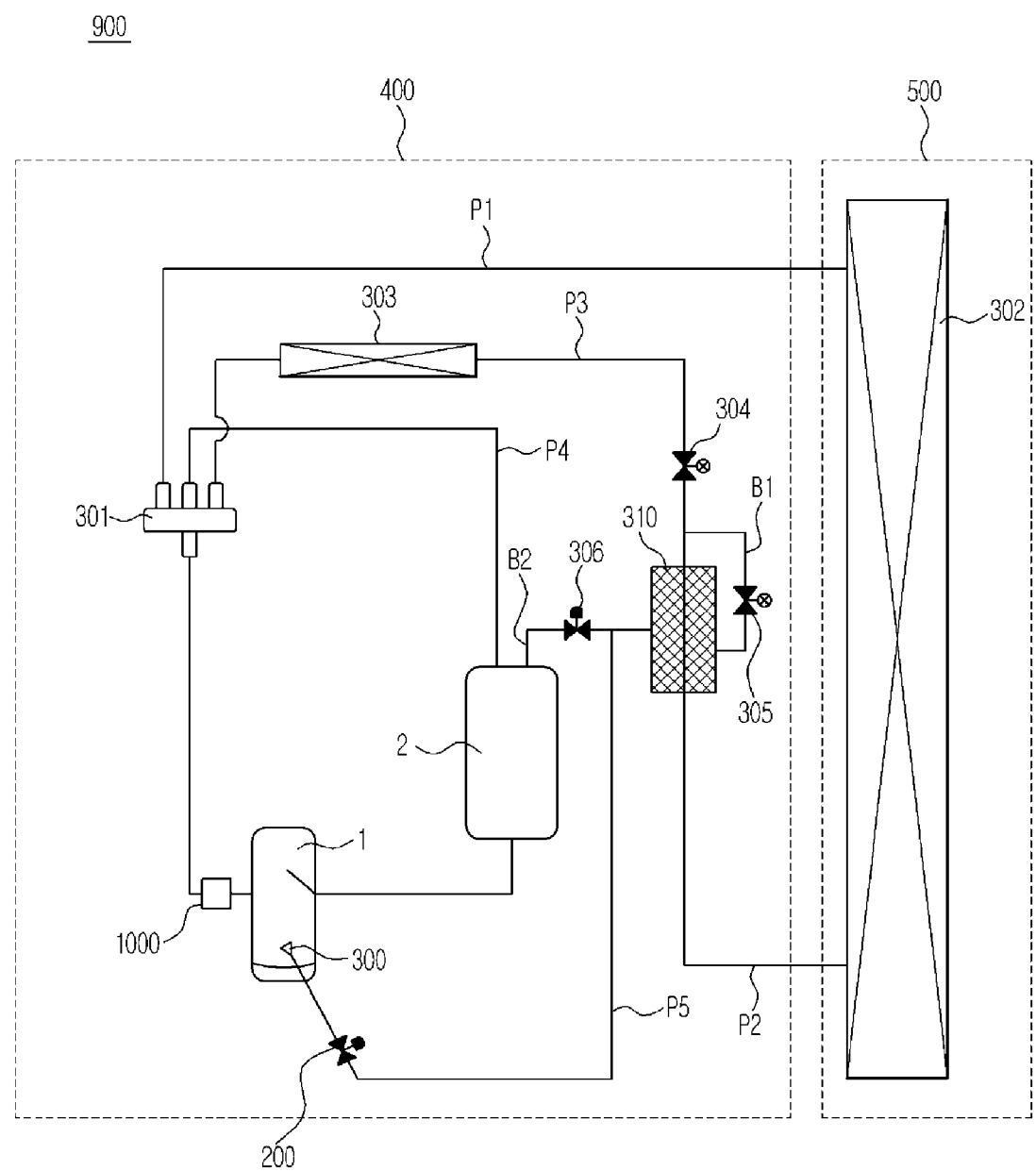

FIGS. 9 and 10 are diagrams illustrating a configuration of an air conditioner according to an embodiment of the present disclosure.

As shown in FIGS. 9 and 10, the air conditioner 900 includes an outdoor unit 400 and an indoor unit 500. The outdoor unit 400 includes a compressor 1, a four-way valve 301 to switch between heating and cooling, an outdoor side heat exchanger 303, and an expansion valve 304, which are sequentially connected to a refrigerant pipe so as to form a closed circuit. The indoor unit 500 includes an indoor side heat exchanger 302.

During heating operation, refrigerant is compressed to high temperature and high pressure in the compressor 1, the compressed refrigerant is supplied to and liquefied in the indoor side heat exchanger 302, the liquefied refrigerant is supplied to and decompressed/expanded in the expansion valve 304, and the decompressed/expanded refrigerant is supplied to and vaporized in the outdoor side heat exchanger 303 and is then resupplied to the compressor 1, thereby circulating the refrigerant.

During cooling operation, refrigerant is compressed to high temperature and high pressure in the compressor 1, the compressed refrigerant is supplied to and liquefied in the outdoor side heat exchanger 303, the liquefied refrigerant is supplied to and decompressed/expanded in the expansion valve 304, and the decompressed/expanded refrigerant is supplied to and vaporized in the indoor side heat exchanger 302 and is then resupplied to the compressor 1, thereby circulating the refrigerant.

When efficiency of the compressor 1 is deteriorated during heating and cooling operation, the air conditioner 900 injects intermediate pressure refrigerant into the compressor 1 to improve efficiency of the compressor 1.

As shown in FIGS. 9 and 10, in order to inject intermediate pressure refrigerant into the compressor 1, the air conditioner 900 includes an internal heat exchanger 310 provided between the indoor side heat exchanger 302 and the outdoor side heat exchanger 303 to produce the intermediate pressure refrigerant via heat exchange, a bypass pipe B1 which is bypassed from refrigerant pipes P2 and P3 connecting the indoor side heat exchanger 302 and the outdoor side heat exchanger 303 is connected to the internal heat exchanger 310, an electric expansion valve 305 which is provided on the bypass pipe B1 so as to expand the refrigerant passing through the bypass pipe B1 and control refrigerant such that the refrigerant enters the bypass pipe B1 or is prevented from entering the same, an intermediate pressure refrigerant injection port 300 which is provided on an intermediate pressure refrigerant guide pipe P5 to guide the intermediate pressure refrigerant produced by the internal heat exchanger 310 to the compressor 1 and injects the intermediate pressure refrigerant into the compressor 1, a switching valve 306 which is provided on an intermediate pressure refrigerant divergence pipe B2 diverging from the intermediate pressure refrigerant guide pipe P5 and controls intermediate pressure refrigerant such that the intermediate pressure refrigerant is injected into the compressor 1 or prevented from being injected thereinto, and a check valve 200 which is provided on an intermediate pressure refrigerant guide pipe P5 and controls intermediate pressure refrigerant such that the intermediate pressure refrigerant is injected into the compressor 1 or prevented from being injected thereinto.

In addition, the air conditioner 900 may further include a discharge temperature sensor 1000 to sense a temperature of refrigerant discharged from the compressor 1. The discharge temperature sensor 1000 may be installed on the refrigerant pipe through which high temperature and high pressure refrigerant discharged from the compressor 1 moves or be installed to the compressor 1.

When the mixture of R32 refrigerant and at least one refrigerant of R1234yf, R1234ze, and R152A is used in the air conditioner 900, the discharge temperature of the refrigerant discharged from the compressor 1 may increase, compared with when existing refrigerant (for example, R22) is used, at a condition of AHRI540 (Air Conditioning, Heating, and Refrigeration Institute 540).

When the discharge temperature of the refrigerant discharged from the compressor 1 sensed by the discharge temperature sensor 1000 is high, the check valve 200 may decrease the discharge temperature of the refrigerant by injecting intermediate pressure refrigerant into the compressor 1.

The internal heat exchanger 310 may be provided between the indoor side heat exchanger 302 and the outdoor side heat exchanger 303, and be configured of a plate type heat exchanger or dual pipe type heat exchanger.

When the air conditioner 900 performs heating operation, refrigerant condensed by the indoor side heat exchanger 302 operated as a condenser moves to the outdoor side heat exchanger 303 via the internal heat exchanger 310.

A portion of refrigerant moving from the indoor side heat exchanger 302 to the outdoor side heat exchanger 303 passes through the internal heat exchanger 310 and is then supplied to and evaporated in the outdoor side heat exchanger 303 operated as an evaporator via the expansion valve 304.

The remaining portion of refrigerant moving from the indoor side heat exchanger 302 to the outdoor side heat exchanger 303 is bypassed through the bypass pipe B1 and enters the internal heat exchanger 310.

The refrigerant bypassed to the bypass pipe B1 passes through the electric expansion valve 304 provided on the bypass pipe B1 and then enters the internal heat exchanger 310 in an expanded state, during passage through the bypass pipe B1.

The refrigerant bypassed to the bypass pipe B1 and entering the internal heat exchanger 310 exchanges heat with refrigerant moving from the indoor side heat exchanger 302 via the internal heat exchanger 310 to the outdoor side heat exchanger 303. The refrigerant moving from the indoor side heat exchanger 302 to the outdoor side heat exchanger 303 is supplied to the outdoor side heat exchanger 303 in a supercooled state through heat exchange. The refrigerant bypassed to the bypass pipe B1 and entering the internal heat exchanger 310 is overheated and injected, in overheated vapor-phase refrigerant having intermediate pressure, into the compressor 1 through the intermediate pressure refrigerant guide pipe P5.

When the air conditioner 900 performs cooling operation, as shown in FIG. 10, refrigerant condensed by the outdoor side heat exchanger 303 operated as a condenser moves to the indoor side heat exchanger 302 via the internal heat exchanger 310.

A portion of refrigerant moving from the outdoor side heat exchanger 303 to the indoor side heat exchanger 302 passes through the internal heat exchanger 310 via the expansion valve 304 and is then supplied to and evaporated in the indoor side heat exchanger 302 operated as an evaporator.

Although not shown in the drawing, the expansion valve 304 is provided between the internal heat exchanger 310 and the indoor side heat exchanger 302 during cooling operation such that a portion of refrigerant moving from the outdoor side heat exchanger 303 to the indoor side heat exchanger 302 may pass through the internal heat exchanger 310 via the expansion valve 304 and then be supplied to and evaporated in the indoor side heat exchanger 302 operated as an evaporator.

The remaining portion of refrigerant moving from the outdoor side heat exchanger 303 to the indoor side heat exchanger 302 is bypassed through the bypass pipe B1 and enters the internal heat exchanger 310.

The refrigerant bypassed to the bypass pipe B1 passes through the electric expansion valve 304 provided on the bypass pipe B1 and then enters the internal heat exchanger 310 in an expanded state, during passage through the bypass pipe B1.

The refrigerant bypassed to the bypass pipe B1 and entering the internal heat exchanger 310 exchanges heat with refrigerant moving from the outdoor side heat exchanger 303 via the internal heat exchanger 310 to the indoor side heat exchanger 302. The refrigerant moving from the outdoor side heat exchanger 303 to the indoor side heat exchanger 302 is supplied to the indoor side heat exchanger 302 in a supercooled state through heat exchange. The refrigerant bypassed to the bypass pipe B1 and entering the internal heat exchanger 310 is overheated and injected, in overheated vapor-phase refrigerant having intermediate pressure, into the compressor 1 through the intermediate pressure refrigerant guide pipe P5.

As shown in FIG. 9, the bypass pipe B1 is bypassed from the second refrigerant pipe P2 and is connected to the internal heat exchanger 310 such that the refrigerant bypassed to the bypass pipe B1 may enter the internal heat exchanger 310. As shown in FIG. 10, the bypass pipe B1 is bypassed from the third refrigerant pipe P3 and is connected to the internal heat exchanger 310 such that the refrigerant bypassed to the bypass pipe B1 may enter the internal heat exchanger 310.

The electric expansion valve 304 is provided on the bypass pipe B1 such that the refrigerant bypassed to the bypass pipe B1 may enter the internal heat exchanger 310 in an expanded state.

In addition, the refrigerant bypassed to the bypass pipe B1 is controlled such that the refrigerant enters the internal heat exchanger 310 or is prevented from entering the same, depending upon opening or closing of the electric expansion valve 304. When the electric expansion valve 304 is opened, the refrigerant bypassed to the bypass pipe B1 enters the internal heat exchanger 310. Then, in the internal heat exchanger 310, the refrigerant is supercooled or overheated through heat exchange with refrigerant moving from the indoor side heat exchanger 302 to the outdoor side heat exchanger 303 during heating operation. In addition, the refrigerant is supercooled or overheated through heat exchange with refrigerant moving from the outdoor side heat exchanger 303 to the indoor side heat exchanger 302 during cooling operation. The overheated refrigerant is injected, in overheated vapor-phase refrigerant having intermediate pressure, into the compressor 1 through the intermediate pressure refrigerant guide pipe P5.

When the electric expansion valve 304 is closed, refrigerant may not enter the bypass pipe B1. Accordingly, since heat exchange is not performed in the internal heat exchange 310 and intermediate pressure refrigerant is not produced in the internal heat exchange 310, injection of intermediate pressure refrigerant into the compressor 1 is prevented.

The intermediate pressure refrigerant injection port 300 is provided on the intermediate pressure refrigerant guide pipe P5 by which intermediate pressure refrigerant produced through heat exchange in the internal heat exchanger 310 is guided so as to be injected into the compressor 1.

When efficiency of the compressor 1 is deteriorated, the intermediate pressure refrigerant injection port 300 injects intermediate pressure refrigerant produced by the internal heat exchanger 310 into the compressor 1 in order to improve efficiency of the compressor 1.

Since the discharge temperature of the compressor 1 increases when efficiency of the compressor 1 is deteriorated, the discharge temperature of the compressor 1 needs to be decreased in order to improve efficiency of the compressor 1. For this reason, the intermediate pressure refrigerant produced by the internal heat exchanger 310 is injected into the compressor 1, enabling the discharge temperature of the compressor 1 to be decreased.

The switching valve 306 is provided on the intermediate pressure refrigerant divergence pipe B2 diverging from the intermediate pressure refrigerant guide pipe P5 and controls intermediate pressure refrigerant produced by the internal heat exchanger 310 such that the intermediate pressure refrigerant is injected into the compressor 1 or prevented from being injected thereinto.

Since a passage to the accumulator 2 via the intermediate pressure refrigerant divergence pipe B2 is blocked when the switching valve 306 is closed, the intermediate pressure refrigerant produced by the internal heat exchanger 310 is injected into the compressor 1 through the intermediate pressure refrigerant guide pipe P5. When the switching valve 306 is opened, the intermediate pressure refrigerant produced by the internal heat exchanger 310 moves along the intermediate pressure refrigerant divergence pipe B2 diverging from the intermediate pressure refrigerant guide pipe P5 to be stored in the accumulator 2 connected to the intermediate pressure refrigerant divergence pipe B2.

Although not shown in the drawing, the intermediate pressure refrigerant divergence pipe B2 diverging from the intermediate pressure refrigerant guide pipe P5 may be directly connected to a fourth refrigerant pipe P4 without the accumulator. Consequently, when the switching valve 306 is opened, the intermediate pressure refrigerant injected through the intermediate pressure refrigerant divergence pipe B2 may be supplied to the compressor 1 together with the refrigerant moving from the outdoor side heat exchanger 303 to the compressor 1.

The above description is a case of heating operation. During cooling operation, when the switching valve 306 is opened, the intermediate pressure refrigerant injected through the intermediate pressure refrigerant divergence pipe B2 may be supplied to the compressor 1 together with the refrigerant moving from the indoor side heat exchanger 302 to the compressor 1.

The check valve 200 is provided on the intermediate pressure refrigerant guide pipe P5 and controls intermediate pressure refrigerant such that the intermediate pressure refrigerant is injected into the compressor 1 or prevented from being injected thereinto.

When the check valve 200 is opened, the intermediate pressure refrigerant moving along the intermediate pressure refrigerant guide pipe P5 is injected into the compressor 1. When the check valve 200 is closed, the intermediate pressure refrigerant is not injected into the compressor 1. During heating operation of the air conditioner 900, high temperature and high pressure refrigerant discharged from the compressor 1 is introduced into the indoor side heat exchanger 302 operated as a condenser through a first refrigerant pipe P1 via the four-way valve 301 along an arrow indicated on the refrigerant pipe.

Figure 11:
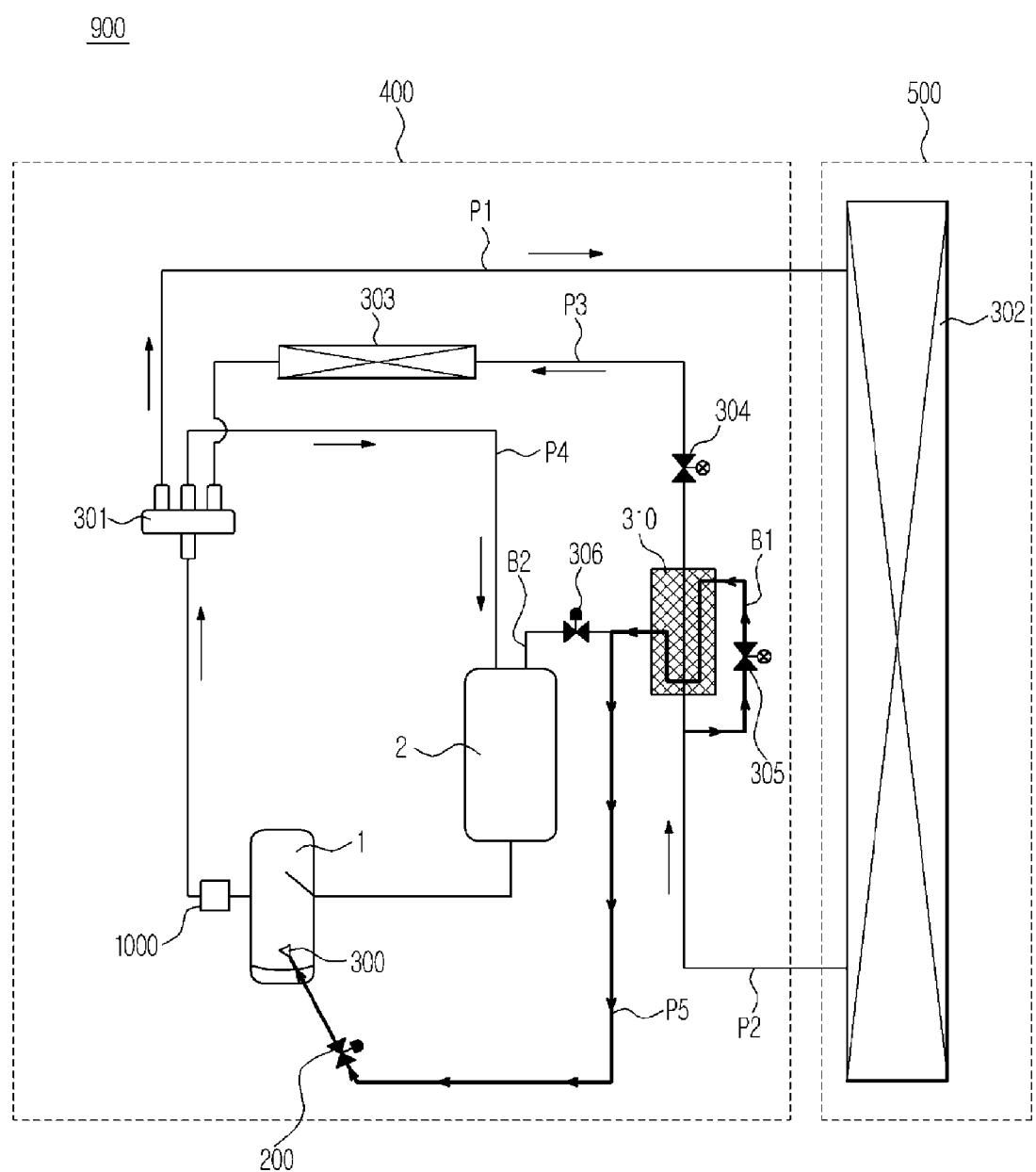
FIG. 11 is a diagram illustrating a process in which intermediate pressure refrigerant is injected into the compressor during heating operation of the air conditioner according to the embodiment of the present disclosure.

FIG. 11 is a diagram illustrating a process in which intermediate pressure refrigerant is injected into the compressor during heating operation of the air conditioner according to the embodiment of the present disclosure.

As shown in FIG. 11, During heating operation of the air conditioner, high temperature and high pressure refrigerant discharged from the compressor 1 is introduced into the indoor side heat exchanger 302 operated as a condenser through the first refrigerant pipe P1 via the four-way valve 301 along an arrow indicated on the refrigerant pipe.

The introduced high temperature and high pressure refrigerant exchanges heat with indoor air outside the indoor side heat exchanger 302 in the indoor side heat exchanger 302, and thus the indoor air warms up.

The refrigerant passing through indoor side heat exchanger 302 moves through the second and third refrigerant pipes P2 and P3, is expanded/decompressed while passing through the expansion valve 304 provided on the third refrigerant pipe P3, is introduced into the outdoor side heat exchanger 303, and is then reintroduced into the compressor 1, thereby forming a heating cycle.

The refrigerant pipe through which the high temperature and high pressure refrigerant discharged from the compressor 1 moves may be provided with the discharge temperature sensor 1000 to sense the temperature of refrigerant discharged from the compressor 1. The discharge temperature sensor 1000 may be provided in the compressor 1 as well as the refrigerant pipe.

In this case, since the discharge temperature of the refrigerant, which is discharged from the compressor 1 and sensed by the discharge temperature sensor 1000, increases when efficiency of the compressor 1 is deteriorated, the discharge temperature of the refrigerant discharged from the compressor 1 needs to be decreased in order to improve efficiency of the compressor 1. For this reason, the intermediate pressure refrigerant is injected into the compressor 1, enabling the discharge temperature of the compressor 1 to be decreased.

In order to decrease the discharge temperature of the compressor 1, the intermediate pressure refrigerant produced through heat exchange, in the internal heat exchanger 310 provided between the second and third refrigerant pipes P2 and P3, of the refrigerant, which moves from the indoor side heat exchanger 302 to the outdoor side heat exchanger 303, and the refrigerant, which is bypassed to the bypass pipe B1 while moving from the indoor side heat exchanger 302 to the outdoor side heat exchanger 303 and enters the internal heat exchanger 310, is injected into the compressor 1.

To this end, the electric expansion valve 304 provided on the bypass pipe B1 is first opened such that heat exchange is performed to produce intermediate pressure refrigerant in the internal heat exchanger 310, thereby allowing a portion of refrigerant moving from the indoor side heat exchanger 302 to the outdoor side heat exchanger 303 to be bypassed to the bypass pipe B1.

The refrigerant bypassed to the internal heat exchanger 310 exchanges heat with the refrigerant moving from the indoor side heat exchanger 302 to the outdoor side heat exchanger 303 through the second and third refrigerant pipes P2 and P3 in the internal heat exchanger 310. The refrigerant moving from the indoor side heat exchanger 302 to the outdoor side heat exchanger 303 is supplied to the outdoor side heat exchanger 303 in a supercooled state through heat exchange. The refrigerant bypassed to the internal heat exchanger 310 is overheated and flows along the intermediate pressure refrigerant guide pipe P5.

The switching valve 306 provided on the intermediate pressure refrigerant divergence pipe B2 diverging from the intermediate pressure refrigerant guide pipe P5 is closed such that the intermediate pressure refrigerant flowing along the intermediate pressure refrigerant guide pipe P5 may be guided to the compressor.

Since the intermediate pressure refrigerant may not be moved to the intermediate pressure refrigerant divergence pipe B2 when the switching valve 306 is closed, the intermediate pressure refrigerant moves along the intermediate pressure refrigerant guide pipe P5.

When the intermediate pressure refrigerant moves along the intermediate pressure refrigerant guide pipe P5, the intermediate pressure refrigerant is injected into the compressor 1 by opening of the check valve 200.

Figure 12:
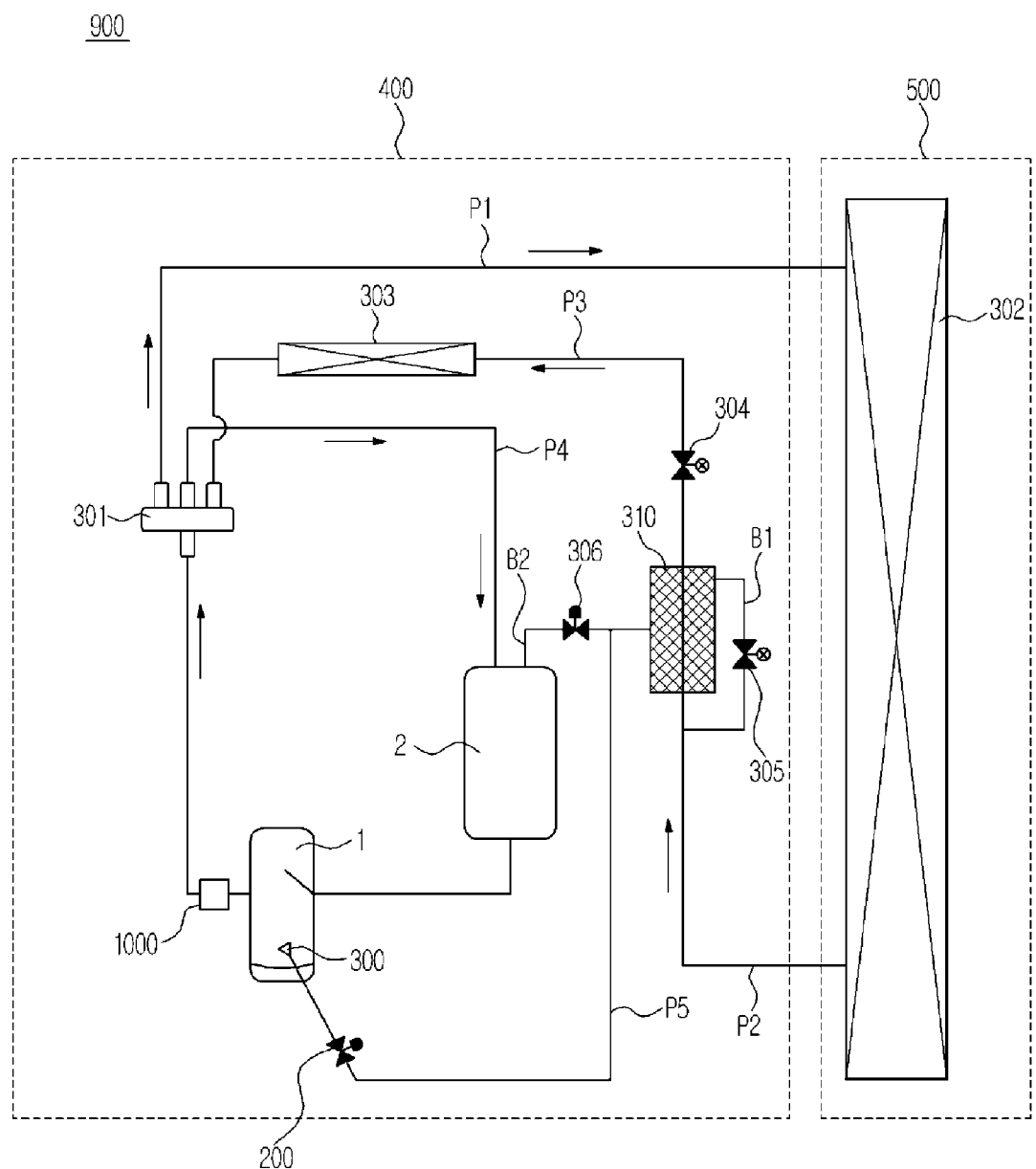
FIG. 12 is a diagram illustrating a case in which intermediate pressure refrigerant is prevented from being injected into and supercooling control is not required for the compressor during the heating operation of the air conditioner according to the embodiment of the present disclosure.

FIG. 12 is a diagram illustrating a case in which intermediate pressure refrigerant is prevented from being injected into and supercooling control is not required for the compressor during the heating operation of the air conditioner according to the embodiment of the present disclosure.

As shown in FIG. 12, if the discharge temperature of the refrigerant, which is discharged from the compressor 1 and sensed by the discharge temperature sensor 1000 decreases, the intermediate pressure refrigerant has to be prevented from being injected into the compressor 1 in order to protect the compressor 1.

In a case in which the intermediate pressure refrigerant is prevented from being injected into and supercooling control is not required for the compressor 1 when the operation frequency of the compressor 1 is maintained at an optimal frequency or the discharge temperature of the compressor 1 decreases, the electric expansion valve 304 is closed such that heat exchange of the refrigerant is not performed in the internal heat exchanger 310 in order for the intermediate pressure refrigerant to be not injected into the compressor 1, as shown in FIG. 12.

When the electric expansion valve 304 is closed, the refrigerant is prevented from flowing to the bypass pipe B1 and the intermediate pressure refrigerant is not produced in the internal heat exchanger 310. Therefore, the intermediate pressure refrigerant is prevented from being injected into the compressor 1.

In this case, since the intermediate pressure refrigerant is prevented from being injected into the compressor 1, the switching valve 306 has to be closed. However, the switching valve 306 may be maintained in an opened state in order to prevent an increase in pipe stress due to flow within the intermediate pressure refrigerant guide pipe P5.

Figure 13:
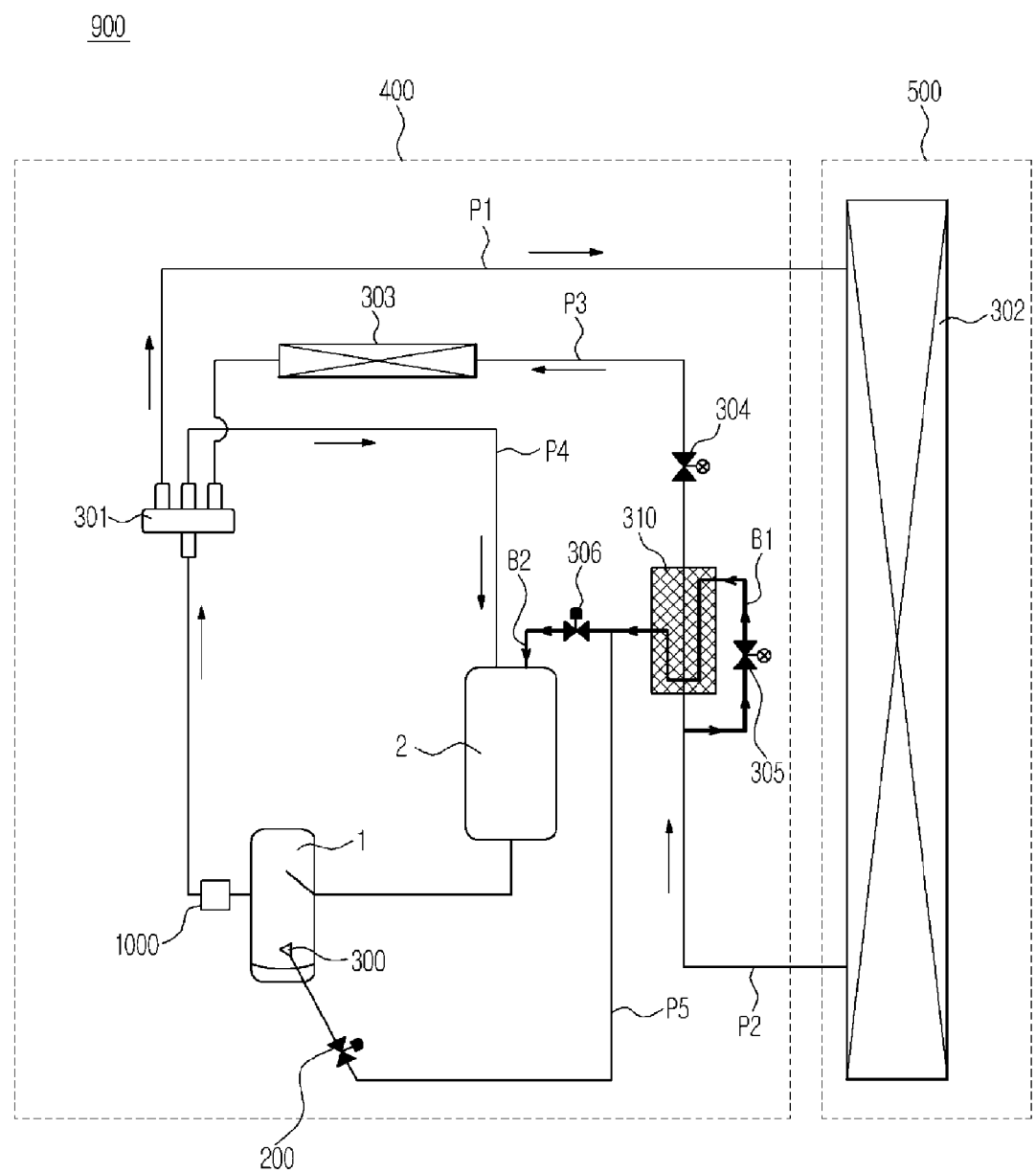
FIG. 13 is a diagram illustrating a case in which intermediate pressure refrigerant is prevented from being injected into and supercooling control is required for the compressor during the heating operation of the air conditioner according to the embodiment of the present disclosure.

FIG. 13 is a diagram illustrating a case in which intermediate pressure refrigerant is prevented from being injected into and supercooling control is required for the compressor during the heating operation of the air conditioner according to the embodiment of the present disclosure.

In a case in which the intermediate pressure refrigerant is prevented from being injected into and supercooling control is not required for the compressor 1 when the discharge temperature of the refrigerant which is discharged from the compressor 1 and sensed by the discharge temperature sensor 1000 decreases, the electric expansion valve 304 is opened such that heat exchange of the refrigerant is performed in the internal heat exchanger 310, the switching valve 306 is opened such that the intermediate pressure refrigerant is prevented from being injected into the compressor 1, and the intermediate pressure refrigerant produced by the internal heat exchanger 310 moves along intermediate pressure refrigerant divergence pipe B2 to be stored in the accumulator 2, as shown in FIG. 13.

When the electric expansion valve 304 is opened, the refrigerant bypassed through the bypass pipe B1 while moving from the indoor side heat exchanger 302 to the outdoor side heat exchanger 303 exchanges heat with the refrigerant moving from the indoor side heat exchanger 302 to the outdoor side heat exchanger 303 in the internal heat exchanger 310. The refrigerant bypassed through the bypass pipe B1 is overheated and moves along the intermediate pressure refrigerant divergence pipe B2 diverging from the intermediate pressure refrigerant guide pipe P5 to be stored in the accumulator 2. The refrigerant moving from the indoor side heat exchanger 302 to the outdoor side heat exchanger 303 is supercooled and moves to the outdoor side heat exchanger 303.

Since a cooling cycle during cooling operation of the air conditioner 900 differs from that during heating operation only in that refrigerant flows in a direction opposite to the direction during heating operation, no description will be given thereof.

The compressor 1 may be applicable to a refrigerator and the like as well as the air conditioner 900.

As is apparent from the above description, a compressor and an air conditioner including the same may decrease a discharge temperature of the compressor by additionally supplying refrigerant having low temperature and intermediate pressure thereto.

In addition, heating performance of the air conditioner may be improved by an increase in refrigerant flow.

Furthermore, a check valve or a hole formed within a cylinder by an injection line acts as a resonator, thereby enabling noise of the compressor to be reduced.

Although a few embodiments of the present disclosure have been shown and described, it would be appreciated by those skilled in the art that changes may be made in these embodiments without departing from the principles and spirit of the invention, the scope of which is defined in the claims and their equivalents.

What is claimed is:

1. A compressor which compresses and discharges refrigerant, comprising:
   a casing defining an external appearance thereof;
   at least one cylinder comprising an inner space, a rolling piston which eccentrically turns in the inner space, a vane which radially abuts the rolling piston and divides the inner space into a suction chamber and a compression chamber, and a vane chamber recessed outward of the inner space such that the vane advances and retreats, the cylinder being provided within the casing;
   a plurality of plates disposed above and below the at least one cylinder so as to define the inner space;
   an injection line provided in an area, within an angle of 220 to 340 degrees from a position of the vane of the at least one cylinder in a direction of rotation of the rolling piston, in one of the at least one cylinder and the plural plates, intermediate pressure refrigerant being supplied to the inner space of the at least one cylinder through the injection line; and
   a check valve installed on the injection line,
   wherein the check valve is closed when the inner space of the at least one cylinder has a pressure higher than a pressure of the injection line to prevent the intermediate pressure refrigerant of the inner space of the at least one cylinder from flowing backward, and
   wherein the refrigerant is a mixture of R32 refrigerant and at least one refrigerant of R1234yf, R1234ze and R152A.

2. The compressor according to claim 1, wherein the check valve is installed by passing through one of the at least one cylinder and the plural plates.

3. The compressor according to claim 1, wherein the at least one cylinder comprises:
   a first cylinder comprising a first supply tube through which refrigerant is supplied to the inner space and a first discharge tube through which compressed refrigerant is discharged into an inner space of the casing; and
   a second cylinder located between the first cylinder and a bottom of the casing, and comprising a second supply tube diverging from the first supply tube and a second discharge tube through which compressed refrigerant is discharged into the inner space of the casing, and
   wherein the plural plates comprises
      a first plate located at an upper side of the first cylinder;
      a second plate located between the first and second cylinders; and
      a third plate located between the second cylinder and the bottom of the casing.

4. The compressor according to claim 3, wherein the check valve passes through the first cylinder and is installed in the area within the angle of 220 to 340 degrees from the position of the vane of the first cylinder in the direction of rotation of the rolling piston, and
   the intermediate pressure refrigerant supplied from the check valve to the inner space of the first cylinder is compressed by the rolling piston and is discharged into the inner space of the casing through the first discharge tube passing through the first plate.

5. The compressor according to claim 3, wherein the check valve passes through the second cylinder and is installed in the area within the angle of 220 to 340 degrees from the position of the vane of the second cylinder in the direction of rotation of the rolling piston, and
   the intermediate pressure refrigerant supplied from the check valve to the inner space of the second cylinder is compressed by the rolling piston and is discharged into the inner space of the casing through the second discharge tube passing through the third plate.

6. The compressor according to claim 3, wherein the check valve is installed at a position corresponding to the area within the angle of 220 to 340 degrees from the position of the vane of the first cylinder in the direction of rotation of the rolling piston by passing through the first plate, and
   the intermediate pressure refrigerant supplied from the check valve to the inner space of the first cylinder is compressed by the rolling piston and is discharged into the inner space of the casing through the first discharge tube passing through the first plate.

7. The compressor according to claim 3, wherein the check valve is installed at a position corresponding to the area within the angle of 220 to 340 degrees from the position of the vane of the first or second cylinder in the direction of rotation of the rolling piston by passing through the second plate, and
   the intermediate pressure refrigerant supplied from the check valve to the inner space of the first or second cylinder is compressed by the rolling piston and is discharged into the inner space of the casing through the first discharge tube passing through the first plate or the second discharge tube passing through the third plate.

8. The compressor according to claim 3, wherein the check valve is installed at a position corresponding to the area within the angle of 220 to 340 degrees from the position of the vane of the second cylinder in the direction of rotation of the rolling piston by passing through the third plate, and
the intermediate pressure refrigerant supplied from the check valve to the inner space of the second cylinder is compressed by the rolling piston and is discharged into the inner space of the casing through the second discharge tube passing through the third plate.

9. The compressor according to claim 3, wherein the check valve installed to the first plate has a shape bent toward the inner space of the first cylinder,
the check valve installed to the second plate has a shape bent toward the first or second cylinder, and
the check valve installed to the third plate has a shape bent toward the second cylinder.

10. The compressor according to claim 3, wherein the check valve installed to the second plate has a shape bent toward both the first and second cylinders.

11. An air conditioner comprising:
a compressor;
a condenser which condenses high temperature and high pressure refrigerant obtained by the compressor;
an expansion valve which converts the refrigerant discharged from the condenser into low pressure refrigerant; and
an evaporator by which the refrigerant discharged from the expansion valve is evaporated and converted into low temperature and low pressure refrigerant,
wherein the compressor comprises
a casing defining an external appearance thereof;
at least one cylinder comprising an inner space, a rolling piston which eccentrically turns in the inner space, a vane which radially abuts the rolling piston and divides the inner space into a suction chamber and a compression chamber, and a vane chamber recessed outward of the inner space such that the vane advances and retreats, the cylinder being provided within the casing;
a plurality of plates disposed above and below the at least one cylinder so as to define the inner space; and
a check valve provided in one of the at least one cylinder and the plural plates, intermediate pressure refrigerant being supplied to the inner space of the at least one cylinder through the check valve, and
wherein the check valve is provided in a first area within an angle of 220 to 340 degrees from a position of the vane of the at least one cylinder in a direction of rotation of the rolling piston or in a second area of at least one of the plural plates corresponding to the first area.

12. The air conditioner according to claim 11, further comprising an injection line connecting the condenser and the compressor.

13. The air conditioner according to claim 12, wherein the check valve is provided on the injection line.

14. The air conditioner according to claim 11, wherein the refrigerant is a mixture of R32 refrigerant and at least one refrigerant of R1234yf, R1234ze, and R152A.

15. The air conditioner according to claim 11, wherein the check valve supplies liquid-phase or gas-phase refrigerant having intermediate pressure to the inner space of the at least one cylinder, depending upon a phase of the refrigerant introduced through the injection line from the condenser.

16. A compressor comprising:
a casing defining an external appearance thereof;
at least one cylinder comprising an inner space, a rolling piston which eccentrically turns in the inner space, a vane which radially abuts the rolling piston and divides the inner space into a suction chamber and a compression chamber, and a vane chamber recessed outward of the inner space such that the vane advances and retreats, the cylinder being provided within the casing;
a plurality of plates disposed above and below the at least one cylinder so as to define the inner space;
an injection line installed by passing through one of the at least one cylinder and the plural plates, intermediate pressure refrigerant being supplied to the inner space of the at least one cylinder through the injection line;
a check valve installed on the injection line; and
a drive element which has a rotary shaft passing through the at least one cylinder and the plural plates and provides driving force allowing the rolling piston to turn.

17. The compressor according to claim 16, wherein the drive element comprises a BLDC motor in which rotational speed of the rotary shaft is variable or a constant-speed motor in which rotational speed of the rotary shaft is constant.

18. The compressor according to claim 16, wherein the check valve is provided in an area within an angle of 220 to 340 degrees from a position of the vane of the at least one cylinder in a direction of rotation of the rolling piston.

19. The compressor according to claim 16, wherein the check valve is provided in at least one of the plural plates corresponding to an area within an angle of 220 to 340 degrees from a position of the vane of the at least one cylinder in a direction of rotation of the rolling piston.

20. The compressor according to claim 16, wherein the at least one cylinder comprises:
a first cylinder comprising a first supply tube through which refrigerant is supplied to the inner space and a first discharge tube through which compressed refrigerant is discharged into an inner space of the casing; and
a second cylinder located between the first cylinder and a bottom of the casing, and comprising a second supply tube installed separately from the first supply tube and a second discharge tube through which compressed refrigerant is discharged into the inner space of the casing,
wherein the refrigerant supplied to the first or second supply tube is a mixture of R32 refrigerant and at least one refrigerant of R1234yf, R1234ze, and R152A.

21. The compressor according to claim 16, wherein the injection line is connected to a condenser which condenses high temperature and high pressure refrigerant discharged from a discharge pipe protruding from a surface of the casing.

* * * * *